March 18, 1969   W. G. HAMBLY ET AL   3,433,513
WINDSHIELD WIPER ARM
Filed April 10, 1967
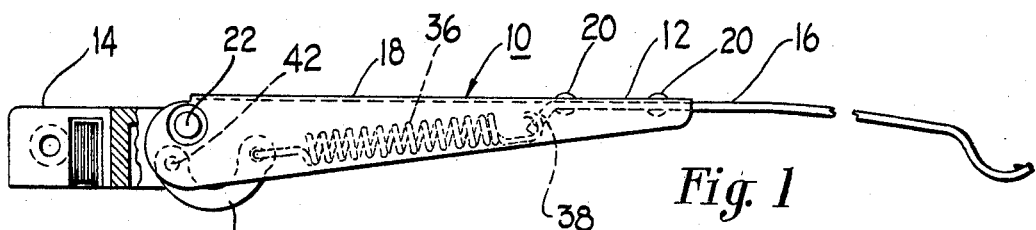
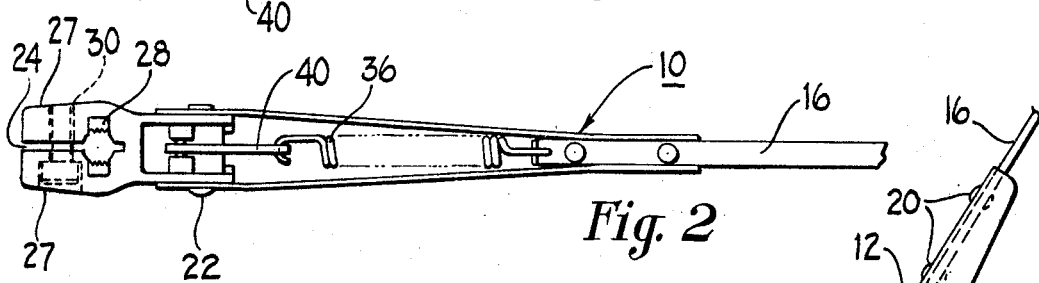
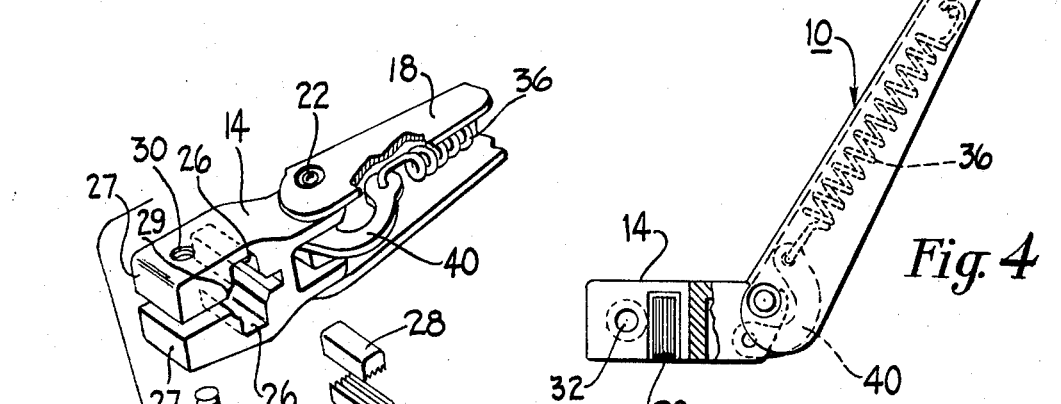
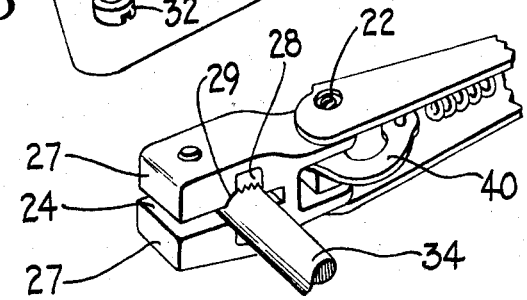
INVENTOR.
WESLEY G. HAMBLY and
BY VITMAR von LANGENDORFF
E. Herbert Liss
ATTORNEY.

United States Patent Office 3,433,513
Patented Mar. 18, 1969

3,433,513
WINDSHIELD WIPER ARM
Wesley G. Hambly, Buffalo, and Vitmar von Langendorff, Tonawanda, N.Y., assignors to Trico Products Corporation, Buffalo, N.Y.
Filed Apr. 10, 1967, Ser. No. 629,509
U.S. Cl. 287—53
Int. Cl. F16l 59/16, 21/00, 55/00, 11/12
4 Claims

ABSTRACT OF THE DISCLOSURE

A windshield wiper arm having an overcenter biasing spring and linkage assembly between an outer arm blade carrying section and mounting head section. The mounting head section includes hardened steel jaw inserts in resilient bifurcated legs for gripping a pivot shaft.

Background of the invention

The invention relates to windshield wiper arms and, more particularly, to an improved wiper arm construction for attaching the arm to an oscillating pivot shaft. In modern automobiles it is essential that the wiper arm and blade assembly when in parked position be closely adjacent the molding at an edge of the windshield to avoid obstructing the driver's vision. To accomplish this an infinitely adjustable arm to shaft connection is required to provide exact adjustment during factory assembly or when a replacement is needed. Complex and expensive arm to shaft connections have been provided for this purpose which are adaptable to specific sizes and shapes of pivot shafts, thus requiring a large inventory for replacement purposes on varying makes and models of automobiles. More economical constructions utilizing simpler connections, as for example set screws, are often utilized. However, such connections are inadequate to withstand the high torque applied at the connection to overcome inertia and the momentum at the reversal points. After a brief period of use the arm to shaft connections become loose and consequently the arm and blade goes out of adjustment. This produces parking of the wiper in a position which interferes with operator vision and also produces an improper wiping pattern.

Summary

By the unique, improved construction of the present invention a wiper arm to blade connector is provided which is capable of precise adjustment; it may be utilized on a wide variety of shaft sizes, thereby reducing inventory requirements; it is economical to manufacture and simple to assemble and adjust; it has the substantial gripping ability required and is highly resistant to wear.

The mounting head is slotted to form a pair of resilient bifurcated legs. A recess is provided in the slotted portion for receiving a pair of opposed, hardened, serrated jaws which embrace the oscillatable pivot shaft. The opposed surfaces of the jaws are of concave cylindrical configuration. Jaws of selected radius may be utilized depending upon the size of the shaft.

The principal object of the present invention is to provide an improved windshield wiper arm which includes an arm to shaft connection that is economical, simple to manufacture and to assemble on a motor vehicle.

Another object of the invention is to provide an improved, simplified, economical windshield wiper arm wherein the mounting head can be adapted to fit a wide range of pivot shafts.

Other objects and advantages of the invention will be apparent from the detailed description taken in connection with the drawings.

Brief description of the drawings

FIG. 1 is a side elevation of an arm incorporating the invention, partly in section.

FIG. 2 is a plan view of the same arm.

FIG. 3 is a fragmentary perspective view of the arm partly exploded.

FIG. 4 is a fragmentary view similar to FIG. 1 showing the arm in another position.

FIG. 5 is a fragmentary perspective view showing the same arm assembled on a shaft.

Description of the preferred embodiments

Referring to the drawing, the windshield wiper arm which is generally designated 10 comprises an outer arm section 12 and a mounting head section 14. The outer arm section 12 comprises a blade retaining elongated arm extension member 16, the free end of which has provision for attaching a wiper blade (not shown). The arm extension member 16 may be rigidly attached at its inner end to a channel-shaped housing member, spring retainer housing 18, in any suitable manner, as for example by rivets as shown at 20. The chanel-shaped housing member 18 is pivoted on a transverse axis at its inner end to the mounting head 14 in any suitable manner as at 22.

The mounting head 14 is a solid member which may be formed in any suitable manner, as for example by machining or die casting and includes a central, longitudinally extending slot 24 having recesses or bores 26 extending transversely on each side of the slot. The recesses are shown as being U-shaped in cross section, having three planar sides, but may be of any suitable shape. The slot 24 forms a pair of resilient legs 27. A pair of jaws 28 are provided and are received in the recesses 26 as by press fit or any other suitable means. The opposed faces of the jaws 28 are serrated and are concave, partial cylindrical surfaces. The jaws 28 may be of any suitable material, preferably of hardened or case hardened steel, to provide a good gripping engagement when assembled on a shaft 34 as shown in FIG. 5. The outer edges 29 of the legs of the U-shaped recesses 26 may be of concave cylindrical shape having substantially the same radius as the surfaces of the jaws 28. However, in accordance with the broader aspects of the invention, the curvature of the outer ends of the legs of the recesses 26 may be slightly different in radius from the radius of the faces of the jaws. It will be apparent that jaws of different sizes may be inserted in the recesses 26 to accommodate different size pivot shafts.

At the end of the mounting head remote from channel-shaped housing 18, a transverse threaded opening is provided which extends across the slot 24 to receive a threaded bolt 32 which constitutes clamping means. Tightening of the bolt 32 in threaded opening 30 compresses the resilient legs 27 formed by the slot 24.

A biasing spring 36 may be provided connected at one end to a down-turned apertured portion 38 at the inner end of the arm extension member 16. The spring is connected at its other end to a curved link 40 which is in turn pivoted to a transverse pin 42 in the mounting head at a point below the pivot 22. Thus, in its operating position, the biasing spring urges the arm and blade against the windshield. When the arm is retracted from the windshield, the axis of the spring passes over the center of the pivot 22; the outer arm section 12 and mounting head 14 are retained in an angular position with respect to each other with the outer arm section biased away from the windshield, as shown in FIG. 4, to permit cleaning of the windshield or removal and replacement of the blade.

The arm is assembled on the shaft 34 by inserting the mounting head on the shaft with the jaws 28 embracing the shaft 34. The bolt 32 is tightened until the serrations on the jaws 28 tightly engage the shaft 34 to prevent undesired rotation of the mounting head relative to the shaft. It can be seen that prior to tightening the bolt 32, the arm may be placed in the precise location, as for example, adjacent the lower molding of a windshield and may be rigidly maintained in such a position. To readjust the arm, the bolt 32 need merely be loosened, the mounting head repositioned and the bolt retightened.

It should now be apparent that an improved wiper arm construction has been provided having a simplified mounting head construction. The mounting head can be readily adapted to various size shafts by insertion of suitable hardened jaws. It provides firm, but infinitely adjustable engagement with the shaft. A certain specific embodiment of the invention has been described for the purpose of illustration, but it will be apparent that various modifications and other embodiments are possible within the scope of the invention. It is to be understood therefore that the invention is not limited to the specific arrangement shown, but in its broadest aspects it includes all equivalent embodiments and modifications which come within the scope of the invention.

What is claimed is:

1. An infinitely adjustable windshield wiper arm assembly for motor vehicles comprising a mounting head section, a bore intermediate the ends of said section adapted to receive a pivot shaft therein for infinite adjustment about the axis of said bore and an outer arm section connected to said mounting head section at one end thereof for relative pivotal movement about an axis transverse to said bore axis, biasing means mounted between said mounting head section and said outer arm section for biasing said outer arm section toward an associated windshield, said mounting head section having wall means defining a slot extending parallel to the axis of said bore and forming a bifurcation in the end of said mounting head section opposite said one end, second wall means disposed above and below said first wall means and parallel to the axis of said bore and defining a recess, said recess and said slot together defining a cruciform shape with said bore disposed at the intersection of said recess and said slot, said bifurcation comprising a pair of resilient legs, a portion of said recess having a planar inner wall surface, a pair of jaws of material having a hardness greater than said mounting head disposed in opposed relation in said recess, one on each side of said slot, and clamping means adjacent the open end of said slot at the end of said mounting head remote from said outer arm section for compressing said resilient legs toward each other whereby a pivot shaft can be grippingly received between said jaws.

2. A wiper arm assembly according to claim 1 wherein opposing surfaces of said jaws are of semicylindrical concave formation.

3. A wiper arm assembly according to claim 2 wherein said opposing surfaces are serrated.

4. A wiper arm assembly according to claim 1 wherein said clamping means comprises a threaded opening extending transversely through said mounting head and a bolt threadably receivable in said opening.

References Cited

UNITED STATES PATENTS

| 1,433,623 | 10/1922 | Johnston. |
| 3,003,793 | 10/1961 | Pitt _____ 285—373 X |
| 3,128,490 | 4/1964 | Alfieri _____ 15—250.35 X |

FOREIGN PATENTS

| 205,476 | 5/1955 | Australia. |

CARL W. TOMLIN, *Primary Examiner.*

ANDREW KUNDRAT, *Assistant Examiner.*

U.S. Cl. X.R.

15—250.34